(12) United States Patent
Smolarek et al.

(10) Patent No.: US 6,334,889 B1
(45) Date of Patent: Jan. 1, 2002

(54) BED RESTRAINT FOR AN ADSORBER

(75) Inventors: James Smolarek, Boston; Jeffert John Nowobilski, Orchard Park; Mark William Ackley, East Aurora, all of NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 09/387,757

(22) Filed: Sep. 1, 1999

(51) Int. Cl.[7] .................................................. B01D 53/04
(52) U.S. Cl. .................................. 96/149; 96/137; 96/152
(58) Field of Search ............................ 96/130–132, 137, 96/149, 152

(56) References Cited

U.S. PATENT DOCUMENTS

| | | | | |
|---|---|---|---|---|
| 3,018,841 A | * | 1/1962 | Gerlich ........................ | 96/149 X |
| 3,464,186 A | * | 9/1969 | Hankison et al. .......... | 96/137 X |
| 4,247,987 A | | 2/1981 | Coulaloglou et al. .............. | 34/1 |
| 4,261,715 A | * | 4/1981 | Frantz .............................. | 96/137 |
| 4,294,699 A | | 10/1981 | Herrmann ..................... | 210/287 |
| 4,337,153 A | * | 6/1982 | Prior .............................. | 210/288 |
| 4,337,353 A | | 6/1982 | Allais et al. ................... | 562/460 |
| 4,406,675 A | | 9/1983 | Dangieri et al. ................. | 55/26 |
| 4,448,594 A | * | 5/1984 | Kozawa ........................ | 96/137 X |
| 4,636,315 A | * | 1/1987 | Allen, Jr. .................... | 96/152 X |
| 4,758,255 A | | 7/1988 | Yamada et al. ................ | 55/316 |
| 4,997,465 A | | 3/1991 | Stanford ........................ | 55/179 |
| 5,176,721 A | | 1/1993 | Hay et al. ......................... | 55/25 |
| 5,324,159 A | * | 6/1994 | Nowobilski et al. ......... | 414/301 |
| 5,486,289 A | | 1/1996 | McCullough ................. | 210/289 |
| 5,492,684 A | * | 2/1996 | Buchanan et al. ...... | 423/244.01 |
| 5,538,544 A | | 7/1996 | Nowobilski et al. ........... | 96/152 |
| 5,759,242 A | * | 6/1998 | Smolarek et al. .............. | 96/149 |
| 5,769,928 A | * | 6/1998 | Leavitt ........................ | 96/132 X |
| RE35,913 E | | 10/1998 | Hay et al. ......................... | 95/96 |
| 5,873,929 A | * | 2/1999 | Andreani et al. .......... | 96/152 X |
| 6,027,548 A | * | 2/2000 | Ackley et al. .............. | 96/130 X |
| 6,129,780 A | * | 10/2000 | Millet et al. ................ | 96/151 X |

FOREIGN PATENT DOCUMENTS

DE  2304990  8/1973

* cited by examiner

*Primary Examiner*—Robert H. Spitzer
(74) *Attorney, Agent, or Firm*—Robert J. Follett

(57) ABSTRACT

An axial flow adsorber apparatus includes a bed of adsorbent material, a barrier in the form of an open-cell material combined with a distribution screen or baffle, graded balls, and an inflatable bladder. The adsorbent bed is the active adsorbent required for a separation process. The barrier combines the open-cell material, which provides uniform retention of all adsorbent material, with the distribution screen, which provides uniform flow and pressure distribution across the bed. The barrier substantially covers a top surface of the adsorbent bed to prevent fluidization of the bed. Graded balls on the barrier uniformly distribute a downward pressure supplied by the inflatable bladder above the balls. The uniform pressure is transmitted through the balls to the barrier to further suppress fluidization. The balls also serve to direct gas flow in the upper end of the vessel and reduce void volume in the apparatus that would trap product gas. The flexible bladder maintains a uniform pressure on the bed while also eliminating a major portion of the void volume in the heads of the adsorber apparatus.

16 Claims, 4 Drawing Sheets

BED RESTRAINT FOR AN ADSORBER

FIELD OF THE INVENTION

The present invention relates to adsorbent beds, and in particular relates to systems for restraining particulates in the adsorbent beds that are subject to the forces of gas or fluid flow. The particulates are restrained against movement resulting, for example, in fluidization of the adsorbent bed. More particularly, in a cylindrical adsorbent bed, a bladder at an end of the adsorbent bed applies pressure to the adsorbent packing of the bed to restrain the packing, i.e. to keep the adsorbent packing from moving and becoming fluidized.

BACKGROUND OF THE INVENTION

In an adsorber apparatus, the flow capacity of adsorbent beds is limited by the flow at which the bed becomes fluidized. When the bed becomes fluidized the adsorbent begins to degrade and channeling causes the efficiency of the adsorption process to drop considerably. When an adsorbent bed is properly restrained fluidization will not occur and the capacity of the adsorption process will thereby not be limited by this point. Restraining the bed therefore will permit a significant increase in flow capacity and thus a corresponding reduction in capital costs.

Improvements in gas separation process performance are currently being realized as a result of enhanced adsorption rate. Furthermore, adsorption rate considerations have resulted in a number of configurations calling for small particles throughout the adsorber as well as layers or mixtures of particles of different average particle size. For example, it is known that using particles having a larger size can reduce fluidization and minimize pressure drop. On the other hand, smaller particles are preferred for overcoming limitations to process performance such as, for example, the adsorption rate. However, fluidization is more likely to occur at decreasing flow velocity as the size of particles is decreased, thereby limiting the particle size for a process conducted at given flow rate, i.e., particles of a particular size establish a fluidization limit, a maximum flow velocity which if exceeded requires either the reduction in flow velocity or the constraint of the particles at one or both ends of the bed. Fluidization can be eliminated or reduced for all particle sizes in axial flow adsorbers if the free adsorbent surface of the bed is constrained. Other reasons for constraining adsorbents in axial flow adsorbers include elimination of scouring of the top of the bed due to high velocity purge or repressurization flows, shop-loading of adsorber vessels and prevention of "bumping" or temporary lifting due to pressure disturbances from valve operations.

Apparatus used for pressure swing adsorption cycles generally employ cylindrical vessels adapted for either a radial flow or an axial flow pattern. Vessels adapted for an axial flow pattern are often preferred due to a simple construction which avoids a number of problems or design complexities inherent with vessels adapted for a radial flow pattern. However, with axial flow the limitation of fluidization of the bed must be addressed.

Adsorbent particles are inherently constrained in most vertically oriented radial flow adsorbers as the flow is lateral to the vertical axis. This makes the gravity vector normal to the flow velocity vector, and allows for relatively easy installation of an adsorbent restraint assembly.

In contrast, axial flow adsorbers have the velocity and gravity vectors aligned, which has historically made the installation of an adsorbent restraint assembly relatively difficult. Therefore for example in upflow axial flow vessels the top surface of the adsorbent bed is typically unobstructed leaving adsorbent particles free to fluidize under sufficient lifting conditions, e.g., a volume or a velocity of fluid sufficient to overcome the force of gravity acting on the particles. Fluidization of this nature is also a concern with downflow axial beds, in which regeneration and desorption flows would subject the particles to possible fluidization.

Faster cycles and smaller bed size are also desirable, particularly in the design of vacuum pressure swing adsorption (VPSA) systems. To achieve this design objective, feed velocities are increased. Present axial bed oxygen VPSA systems operate with an average superficial feed velocity of, for example, 0.15–0.3 m/sec for a bed size of 600–800 pounds of adsorbent per ton per day of oxygen. This feed rate and the corresponding bed design results in operation of the system at near fluidization levels. In fact, overlapping countercurrent equalization flow steps have been incorporated into the process at the beginning of the feed step to help restrain the adsorbent under the high initial feed flow.

As a result of operation at levels close to fluidization, some commercial beds have experienced bed fluidization due to valve failure or poorly chosen cycle tuning parameters. This fluidization disturbs the uniform dense packing of large sections of the adsorber bed, resulting in subsequent gas flow maldistribution and associated poor process performance. Thus, a simple, effective restraint system for the top surface of a particulate adsorbent bed in an adsorber having an axial flow pattern would be desirable to improve adsorption rates.

In addition to particle restraint within an adsorber vessel chamber, it is also desirable to provide for uniform flow through the adsorber bed, to eliminate unnecessary void volume and to provide full access to the interior of the vessel. Uniform flow through the adsorber bed ensures that the gas or liquid material being treated is uniformly exposed to the adsorbent particles. Eliminating unnecessary void volume reduces the loss of processed product or unprocessed feed that is trapped in the apparatus after the adsorption process is complete. Full access to the interior of the vessel permits the apparatus to be maintained, and permits the sieve material to be maintained, loaded or changed.

DESCRIPTION OF THE PRIOR ART

A number of approaches to solve or circumvent the adsorbent bed fluidization problem have been used or proposed. Flow direction, special packings, and restraints of various designs are among the prior art solutions to this problem. Related prior art includes the following patents.

In U.S. Pat. No. 5,492,684, Buchanan et al. describe a method and system for the removal of contaminants such as sulfur oxides from waste gages using a graded-bed system. The graded-bed system uses beds with solid sorbents of two or more particle sizes in separate sections of the bed. In one embodiment the solid sorbents are arranged so the larger sorbent particles are disposed in the entrance region of the graded-bed system. In operation, a waste gas stream is passed over and through the solid sorbents so that contaminants, such as sulfur oxides and/or nitrogen oxides are adsorbed. The sorbent bed is then contacted with a reducing gas to desorb the sulfur oxides. The use of expandable means applied to the bed to insure the stability of the bed is not disclosed.

U.S. Pat. No. 4,337,153 to Prior discloses an improved resin tank for a water softening apparatus including an expandable chamber that enlarges during fluid flow through the tank to displace any free space in the tank, thereby maintaining the compactness of the water softening material. The expandable chamber is formed by an elastomeric sleeve that is secured to and surrounds a portion of a downward extending fluid conduit and overlies at least one aperture formed in the conduit wall through which fluid communication is established. The pressure drop normally occurring during fluid flow through the tank generates a pressure differential on the sleeve wall that causes it to enlarge if there is free space in the tube. In an alternate embodiment, the fluid communication between the conduit and the chamber is provided by a pitot tube that is disposed in the conduit fluid flow path and is operative to communicate the velocity pressure of the fluid flowing down the conduit to the chamber.

A bed of particulate ion-exchange material, in U.S. Pat. No. 4,294,699 by Hermann, is confined in the cavity of a container bound by a wall portion of the container which is movable inward of the cavity. Supply and discharge conduits communicate with respective portions of the cavity for supplying the liquid to be purified, and for discharging from the cavity the liquid purified by contact with the particulate material. A biasing device engages the container outside the cavity and biases the movable wall portion inward of the cavity, whereby the particulate material is kept under compressive stress, and channeling due to shrinkage of the bed is avoided.

A process for continuous countercurrent contact with a magnetically stabilized fluidized bed is described by Coulaloglou and Siegell in U.S. Pat. No. 4,247,987. The patent relates to the operation of a magnetically stabilized bed with continuous solid addition and removal. The bed particles, which include a magnetizable component, are stabilized against gas by-passing and solid back-mixing (except possibly for the time flow or movement of the solids near the entrance or exit ports or near fluid injection zones) during countercurrent contacting by the use of an applied magnetic field. This is particularly suited for carrying out separation processes. The use of applied magnetic fields in such processes enables one to use small size fluidizable adsorbent particles without encountering high pressure drops. The small adsorbent particles having a magnetic component give faster transfer of the sorbed species from the contacting fluid than with larger adsorbent particles which allows for a closer approach to equilibrium.

An extensible sleeve surrounding a central tubular member to prevent fluidization in an adsorbent bed is disclosed in U.S. Pat. No. 4,997,465 to Stanford. A fluid amplifier amplifies the fluid pressure from the system gases to expand the extensible sleeve. Particles of the zeolite adsorbent are inhibited from becoming fluidized and moving with fluid flows by the clamping pressure between the extensible sleeve and the outside wall of the containing vessel.

U.S. Pat. No. 5,176,721, to Hay et al. discloses an adsorber apparatus with a vertical cylinder in which particulate adsorbers are arranged in vertically oriented layers between two vertically oriented perforated parallel panels extending within a vessel and spaced from one another to define an adsorbent mass chamber. The adsorbent is arranged in two vertical layers, a first part of fine particles and a second layer of larger particles. The gas to be treated is circulated horizontally from one perforated panel to the other perforated panel through the adsorbent layers. A flexible membrane at one end of the wall defines a separate end chamber sealed from the adsorber chamber. A small pipe supplies pressure or vacuum to the end chamber. The particles in the adsorber chamber are restrained between the vertical panels in a relatively fixed position under the effect of compression by the membrane or diaphragm when pressure is maintained in the end chamber at least equal to the highest pressure in the adsorption chamber in an adsorption cycle.

It is among the objects of this invention to provide uniform restraint of adsorbent particles in an axial flow adsorbent bed thereby preventing movement and subsequent degradation of the particles while maintaining high process efficiency.

It is another object of the invention to reduce the void volume of an adsorber vessel thereby improving the adsorption cycle efficiency by reducing the volume of product quality gas remaining in the adsorber vessel after the adsorption step is complete.

SUMMARY OF THE INVENTION

In accordance with the present invention, an adsorber apparatus is provided, comprising a vessel having a peripheral wall and first and second end walls defining a chamber, the peripheral wall defining a cross-section of the chamber and the chamber having an inlet end adjacent the first end wall and an outlet end adjacent the second end wall, and defining a longitudinal axis extending from the inlet end to the outlet end of the wall. The apparatus has an inlet port in fluid communication with its inlet end for supplying a fluid mixture to the vessel, and an outlet port in fluid communication with the outlet end for evacuating a separated gas out of the vessel.

A quantity of particulate adsorbent (either bead, extrudate or granular) is charged to and fills a substantial portion of the chamber between the inlet end and the outlet end of the adsorber vessel, a surface of the quantity of particulate adsorbent corresponding dimensionally to the chamber cross-section and facing its outlet end, the surface being formed of a plurality of individual particles each having a minimum dimension. A porous barrier substantially covers the surface, the barrier being movable with the surface along the longitudinal axis of the chamber, and the barrier being adapted to restrain the individual particles from entering the outlet end and adapted to permit the separated gas product to enter the outlet end of the chamber.

A plurality of balls (or similar objects) of graded sizes is further provided in the outlet end positioned between the barrier and the second end wall. Finally, a bladder is positioned between the plurality of balls and the second end wall, the bladder being adapted to be pressurized to bias the barrier against the surface such that the quantity of particulate adsorbent is held with a compressive force sufficient to prevent fluidization of the adsorbent.

Employing the adsorber of the invention, the void volume of the adsorber vessel is reduced thereby improving the adsorption cycle efficiency. The installation of the restraint bladder above the adsorbent bed in a manner that eliminates unnecessary void under the top head, and the use of the graded balls directly above the adsorbent bed minimizes the top void in the axial bed vessel. The unwanted void reduces process efficiency by storing product quality gas in the adsorber after the adsorption step is complete which escapes as inefficient reflux gas during the evacuation step.

The invention provides for uniform gas flow through the adsorbent bed. The design of the hold down bladder under the top head is such that the necessary hold down force is exerted on the adsorbent while the shape is such that uniform gas flow is maintained through the head space and, subsequently, the adsorbent bed. The grading of the balls under the bladder is such that pressure gradients are designed to produce uniform gas flow through the adsorbent bed.

This design of the bladder allows for full access to the vessel to load or change sieve material. Proper loading of the adsorbent material is necessary in order to maintain uniform pressure drop and therefore uniform flow through the adsorbent bed. In order to achieve this loading characteristic, the top head space must be accessible during the loading period utilizing a particle loader such as described in U.S. Pat. No. 5,324,159 to Nowobilski et al. This bladder system and graded ball system provides for this accessibility.

BRIEF DESCRIPTION OF THE DRAWINGS

Other features and additional objects and advantages of the invention will readily be appreciated by reference to the following detailed description of preferred embodiments when considered in conjunction with the accompanying drawings in which.

DETAILED DESCRIPTION

Figure 1:
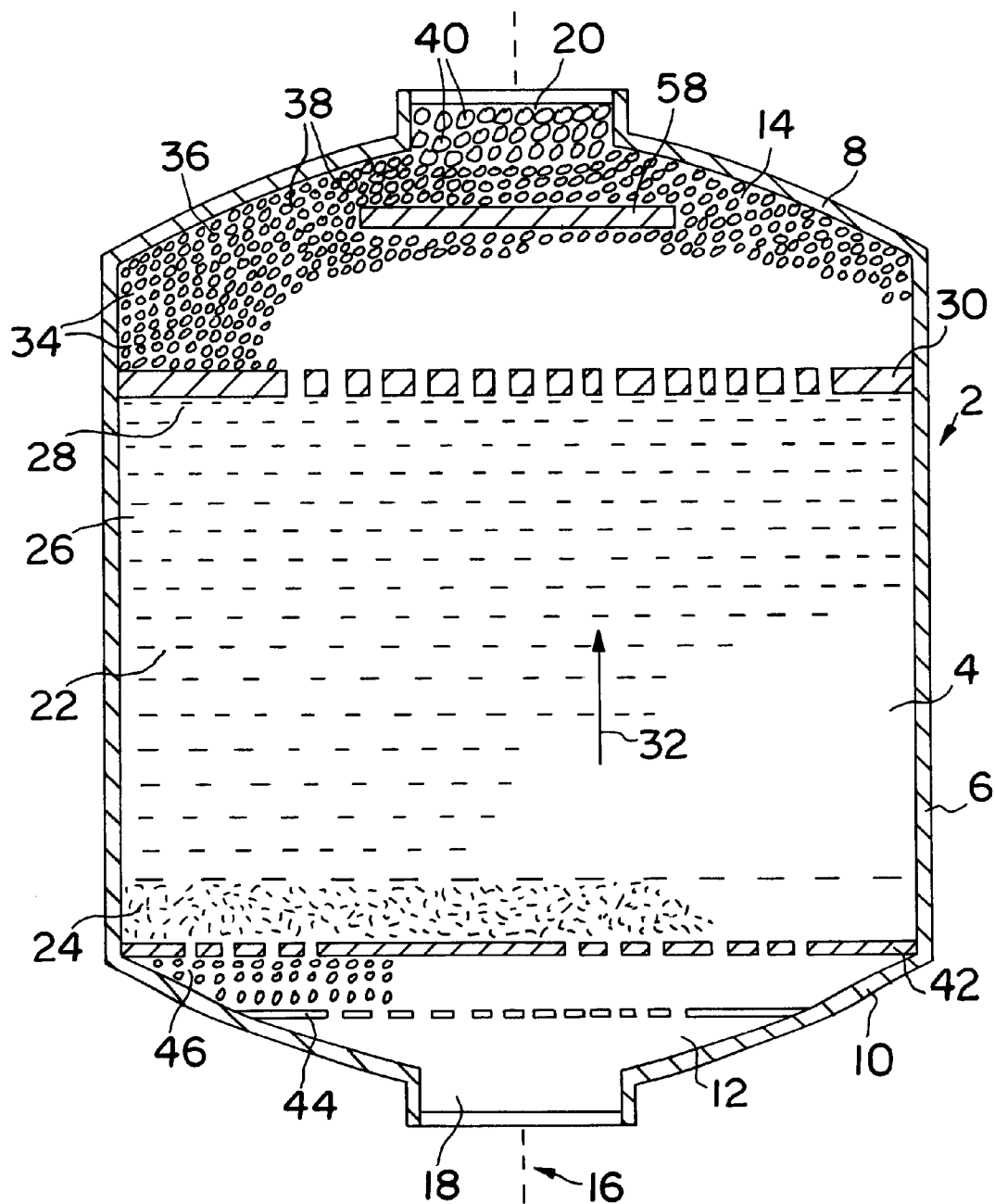
FIG. 1 shows a cross-sectional view of an adsorber apparatus of the invention in elevation.

Referring now to FIG. 1, an axial flow adsorber apparatus is shown generally at 2 having a vertically oriented chamber 4 defined by a peripheral wall 6 and top and bottom end walls 8, 10, respectively. The peripheral wall 6 defines a cross-section of the chamber 4. The peripheral wall 6 and end walls 8 and 10 are made of known materials, such as, for example, metal, glass reinforced polyester or other, resin, etc., and by known methods. The chamber 4 has an inlet end 12 adjacent to the bottom end wall 10 and an outlet end 14 adjacent to the top end wall 8. A longitudinal axis 16 extends from the inlet end 12 to the outlet end 14. An inlet port 18 is provided in the bottom end wall 10. The inlet port 18 is in fluid communication with the inlet end 12 to permit supply of a fluid mixture to be provided to the inlet end 12 of the chamber 4.

The fluid mixture is a liquid or gas requiring separation, purification or alteration by exposure to an adsorbent. The fluid mixture flows from the inlet port 18 into an adsorbent bed 22 in the chamber 4. The fluid flows in the direction indicated by arrow 32. As the fluid flows through the adsorbent bed 22, components of the fluid are adsorbed by the adsorbent, and the mixed fluid is converted into a separated fluid product which flows into the outlet end 14 of the chamber. An outlet port 20 is provided in the top end wall 8 such that it is in fluid communication with the outlet end 14 to permit evacuation of the separated fluid product from the chamber 4. The separated fluid product is a liquid or gas that has been treated by exposing it to the adsorbent bed 22 in the chamber 4.

The quantity of particulate adsorbent in bed 22 fills a substantial portion of the chamber 4 between said inlet end 12 and said outlet end 14. The particulate adsorbent in bed 22 may be provided in one or more layers 24, 26, each having different physical or chemical properties, such as, for example, coarseness, adsorbent capacity, etc. The particulate adsorbent is supported at the inlet end 12 on a first support 42 which is sufficiently porous to permit the passage of mixed fluid from the inlet end 12 into the particulate adsorbent in bed 22, but prevents the particulate adsorbent from entering the inlet end 12.

A plurality of ceramic balls 46 in the inlet end 12 are supported immediately below the first support 42 on a second support 44, which is also porous. The balls 44 facilitate the distribution of mixed fluid to the particulate adsorbent through voids and channels created between the balls. The balls 46 may also provide additional support for the first support. The first and second supports are preferably perforated sheet material covered with metal screens. The first and second supports should be selected to have sufficient strength to provide support for the particulate adsorbent and other components of the structure above the inlet end 12.

An upper surface 28 of the particulate adsorbent bed 22 conforms dimensionally to the cross-section of the chamber 4. The surface 28 faces the outlet end of the chamber. The surface 28 is preferably comprised of particles selected such that no particle is smaller than a minimum dimension.

The restraint on the particulate adsorbent bed comprises a porous barrier 30 adapted to substantially cover the top surface 28 of the quantity of particulate adsorbent in bed 22 to prevent the loss of particulate adsorbent into the output end 14. The porous barrier 30 is further adapted to permit the separated fluid product to permeate from the particulate adsorbent and enter the outlet end 14. Preferably, the barrier 30 is movable with the top surface 28 along the longitudinal axis 16. The porous barrier may be a fabric screen, a fibrous mat, or an open cellular material of known composition and construction so long as it is capable of preventing the particles of the top surface 28 from entering the outlet end 14 of the chamber 4.

Figure 3:
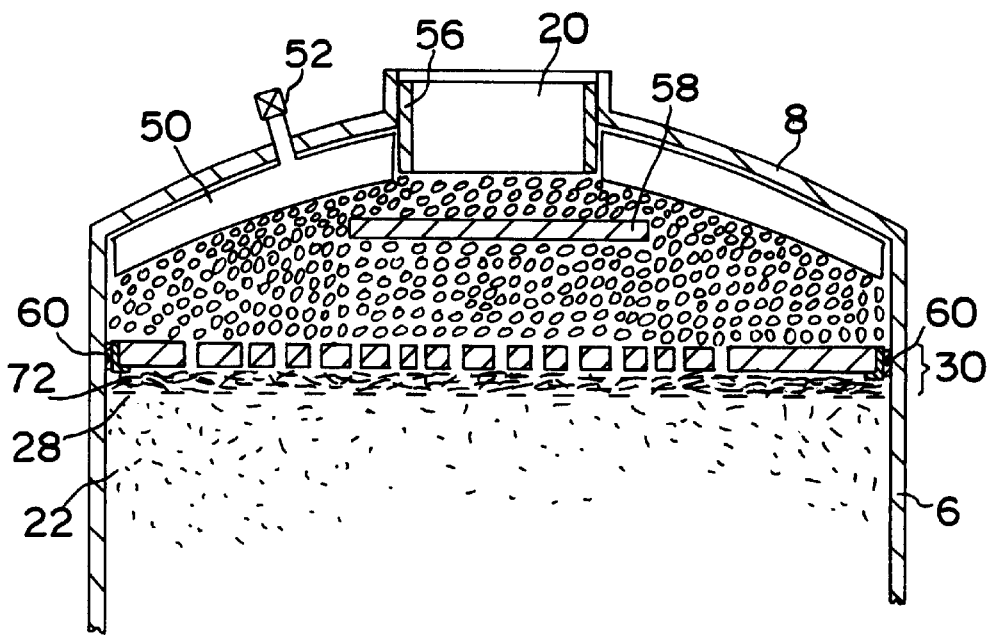
FIG. 3 is a partial cross-sectional view of the outlet end of FIG. 2 with the bladder shown in an inflated state.
Figure 4:
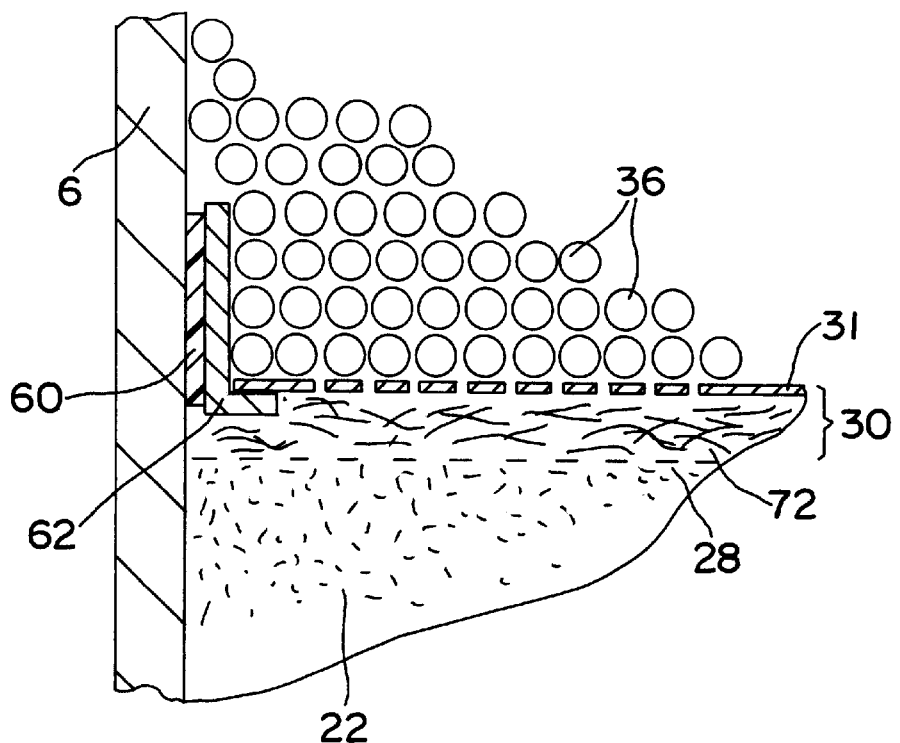
FIG. 4 is a partial cross-sectional view of the seal between the peripheral wall of the vessel and the edge of the porous barrier.
Figure 5:
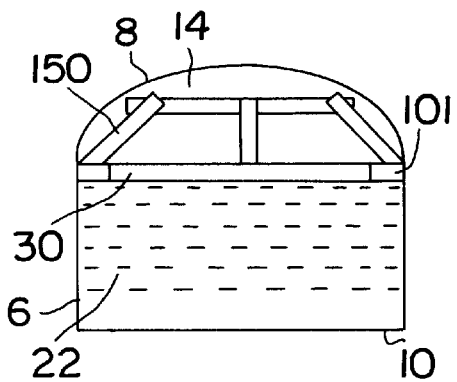
FIG. 5 is a side cross-sectional view of an adsorber apparatus of the invention showing a retainer ring biased by a spider assembly.
Figure 6:
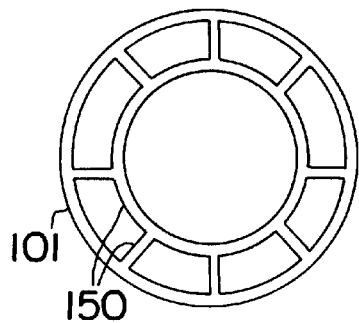
FIG. 6 is a top plan view of the spider assembly.

In the preferred embodiment of the invention shown in FIGS. 3 and 4, the barrier 30 comprises a first layer 31, a fabric screen or perforated sheet metal, over a second layer 72 of a fibrous mat or open cell material. The materials and/or construction of the barrier 30, particularly the layer 72, are selected to have apertures smaller than the minimum dimension of the particles making up the top surface 28 of the adsorbent bed 22. The materials and construction of the porous barrier 30 are further selected to optimize the passage of the separated fluid product from the adsorbent bed 22 to the outlet end 14. To this end, the fabric screen or perforated sheet 31 is selected to facilitate the flow of fluid (i.e., gas or liquid) to the outlet end 8. Alternatively, the barrier may comprise one or more layers of a fabric screen (woven or laminated), a perforated sheet web made from, for example, metal, nylon, fiberglass, or other resin, etc., a fibrous resin mat, or an open cellular material such as an elastomer, or any combination of the above. For example, the porous barrier 30 may comprise a laminate combining a metal screen, in the form of either a woven fabric or perforated sheet, and a fibrous mat or open cellular material layer. It will be readily understood that appropriate single material barriers, or layered combinations of materials may be selected to optimize the passage of separated fluid product while minimizing the loss of adsorbent into the output end 14.

A plurality of balls 36 are positioned on top of the barrier, preferably in several layers 34, 38, 40. The layers of balls 36 serve several purposes. First, the balls 36 facilitate the passage of the separated fluid product from the barrier 30 through spaces between the balls 36 to the outlet port 20. Second, the balls 36 occupy void space in the outlet end, i.e., space that would normally be occupied by separated fluid product which would not be recoverable from the void space. Thus, the balls increase the volume of separated fluid product recoverable from each adsorption cycle. Finally, by their weight, the balls serve as a means for biasing the porous barrier 30 towards the top surface 28 of the adsorbent bed 22. The preferred arrangement of balls includes a first layer 34 of one inch ceramic balls immediately on top of the porous barrier 30. A second layer 38 of two inch ceramic balls is positioned between the layer 34 of one inch ceramic balls and a portion of the top end wall 8 of the vessel 2. A third layer 40 of two inch steel balls is placed on top of the two inch ceramic balls in the vicinity of the output port 20 to add substantial weight to bias the porous barrier toward the surface 28 of the particulate adsorbent bed 22.

As noted in the foregoing paragraph, the weight of the balls 36 positioned on top of the porous barrier 30 acts to bias the barrier toward the particulate adsorbent in bed 22. If the porous barrier 30 is biased toward the particulate adsorbent with sufficient force, the particulate adsorbent in the bed will be prevented from fluidizing at high flow rates. For higher flow rates, the weight of the balls 36 on the barrier 30 may not provide enough downward force on the barrier 30 to prevent fluidizing of the particulate adsorbent. Accordingly, at higher flow rates, a means is provided to yield sufficient downward pressure on the barrier 30 to prevent fluidization of the particulate adsorbent.

A downward force sufficient to prevent fluidization of the particulate adsorbent may be provided by an inelastic structure fastened to the peripheral wall or extending between the top end wall 8 and the barrier 30, such as, for example, one or more rigid members, a rigid frame or a plurality of rings or washers that hold the barrier 30 down on the surface 28 at a fixed position relative to the longitudinal axis of the apparatus. The inelastic structure can be positioned on the barrier during the loading of the apparatus from the top, and secured when the top end wall 8 is fastened to the peripheral wall 6. Alternatively, the inelastic structure can be installed through the outlet port, and forced into a position between the top end wall 8 and the barrier 30 such that it bears against the barrier with sufficient force to prevent fluidization of the bed.

Figure 2:
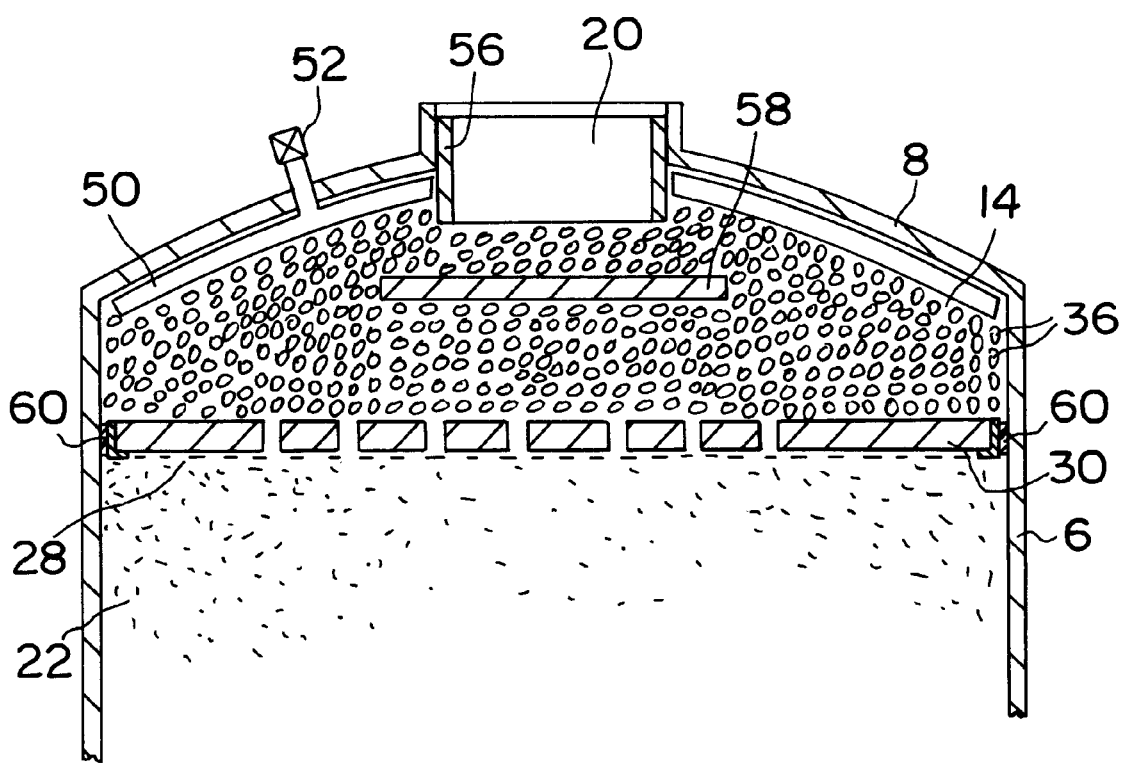
FIG. 2 is a partial cross-sectional view of the outlet end of the apparatus with an un-inflated bladder installed.

Preferably, to impart sufficient force to the barrier 30 to prevent fluidization of the bed, an elastic structure, such as, for example, a spring or an elastic member, bears against the barrier 30 directly, or bears against the balls 36 supported on the barrier 30. The preferred elastic structure is an inflatable bladder 50 (FIGS. 2 and 3) which is positioned between the balls 36 and the top end wall 8, and which bears on the barrier 30 through the balls from the outlet end to the outlet port. A tube or cylinder 56 extends from the outlet port 20. The bladder 50 is ring shaped to provide access into the outlet end 14 through the center of the ring shaped bladder 50. In FIG. 2, the bladder 50 is shown in a deflated state. In FIG. 3 the bladder 50 is shown in an inflated state. The bladder 50 is provided with a valve 52 adapted to be connected to a source of pressurized gas or liquid. The deflated state is preferred to facilitate installation in the apparatus, and after installation, to facilitate loading and maintenance of the particulate adsorbent bed 22 and balls 36. The bladder 50 can also be selectively inflated to a desired pressure to bias the barrier 30 against the surface 28 such that the particulate adsorbent bed 22 is held with a predetermined compressive force and is thereby prevented from fluidization.

By directing the bias of the bladder 50 through the balls 36 to the barrier 30, a force is exerted upon the adsorbent bed 22 along the longitudinal axis, i.e., along the same axis as the fluid flow path through the axial flow adsorber apparatus. While the balls 36 transmit the bias force of the bladder 50 substantially uniformly to the barrier 30, the voids and channels between the balls 36 provide more than sufficient space for the separated fluid product exiting the bed of adsorbent 22 to flow to the outlet port. The balls and the bladder occupy a significant amount of void volume in the outlet end that would otherwise trap a quantity of separated fluid product that is generally considered to be difficult to recover. The combination of the ring shaped bladder, the balls and the porous barrier provide an axial flow adsorber apparatus bed restraining system that is simple to assemble, and that produces more efficient results.

In a preferred embodiment, the barrier 30 is an open-celled material that is placed at the top of the bed of adsorbent particles 22, allowing the gas to pass through at the product end. A distribution baffle, made of screen material or perforated plate, is placed above the open-cell material to help direct the gas stream. Ceramic balls are then installed over the screen material. The balls are graded according to size, and are selected and arranged to direct fluid flow in a uniform manner across the bed cross section. The pattern and hole size of the barrier, i.e., the screen material, fibrous mat or open cell material, is similarly chosen to direct fluid flow uniformly across the bed of adsorbent. The ball grading and screen selection also provides the required pressure drop gradient which allows the fluid (preferably gas) to exit through the outlet port.

The tube 56 is inserted through the top end wall and is held in place by the bladder 50 and the outlet port 20. A secondary baffle 58 wider than the outlet port 20 "floats" in the balls 36 directly below the outlet port 20. The secondary baffle prevents the balls from escaping through the outlet port. The large force necessary to hold down the open-cell material, and hence the adsorbent bed, is supplied by the inner tube-like, ring shaped bladder described above. The bladder compensates for expansion or contraction of the bed of adsorbent at a relatively constant and uniform hold down pressure. Therefore, variations in adsorbent height or settling during operation can be tolerated, although the restraint system of the system is designed to minimize such motion of the bed.

The openings in the barrier 30, i.e., in the fabric screen, perforated plate, fibrous mat or open-cell material, must also be chosen carefully to have dimensions small enough to retain the smallest particles of adsorbent while avoiding plugging or significant reduction in open flow area, a condition that would lead to severe increases in pressure drop.

In a preferred embodiment, the apparatus includes a bed of adsorbent material 22, a barrier 30 in the form of an open-cell material combined with a distribution screen or baffle (fabric or perforated sheet), graded balls 36, and a flexible bladder 50. The bed of adsorbent material, of course, is the active adsorbent required in the separation process. The barrier combines the open-cell material, which provides uniform retention of all adsorbent material, with the distribution screen, which provides uniform flow and pressure distribution across the bed. The graded balls supply uniform bed support while reducing void volume and acting to direct gas flow in the upper end of the vessel. The flexible bladder maintains a uniform pressure on the bed while also eliminating a major portion of the void volume in the head of the cylindrical vessel.

Each particle on the top surface of the particulate adsorbent bed must be held in place to prevent particle attrition and long term bed degradation. To best accomplish this the barrier 30 is a flexible porous mat placed on top of the densely loaded bed of adsorbent, e.g., a sieve bed. The mat may be a fibrous material or an open cell foam with high flow permeability. The important characteristic is that the openings in the mat are smaller than the individual particles of the adsorbent bed, i.e., generally the largest dimension of mat opening is less than 0.7 mm. The mat is dimensioned slightly larger than the cross section of the chamber so that the edges will be compressed against the peripheral wall of the chamber, thus ensuring a suitable seal at the edge of the mat. The overall mat thickness is selected to be small so that its added pressure drop is minimal. The mat is then covered with dense (steel or ceramic) graded balls. The smaller balls result in uniform compression of the mat which then uniformly loads each adsorbent bead on the top of the bed.

Uniform flow distribution at a minimum pressure drop is achieved through control of the size and placement of the balls and through the location of the inlet baffle, which is either solid or perforated. The baffle is designed to be loaded by the top bladder. Pressure exerted by the top bladder is applied to the balls which in turn hold the baffle in place, therefore uniform hold-down pressure is applied to the entire bed cross section including the area of the bed directly under the baffle. Additionally, the bottom of the baffle can be covered with a dense mat to insure uniform loading of the top layer of the balls directly under the baffle.

The bladder can also be used to reduce the top head void volume by selectively removing some of the graded balls at the middle radii of the head and allowing the bladder to fill that void. The components are carefully selected and arranged to reduce volume without hindering flow distribution since being overly aggressive in void volume reduction will result in channeling and increased pressure drop.

In an alternative embodiment of the apparatus, the barrier 30 could be fixedly mounted to the peripheral wall of the chamber, and the first support 42 could be movable relative to the longitudinal axis. A bladder installed beneath the balls 46 would be inflated to force the bed of adsorbent 22 against the barrier 30. However, this arrangement does not facilitate loading and maintenance of the apparatus.

Alternatively, the invention may be applied in a process utilizing a feed flow in the downward direction, i.e., the flow is opposite to that indicated in FIG. 1. In such an application, the advantages of this invention would now favor the desorption or regeneration phase(s) of the cycle. Often the low pressure conditions during desorption result in very high flow velocities, a condition that dictates downflow in this phase of the cycle for unrestrained beds. Therefore, this invention provides the flexibility of introducing feed flow from either the top or the bottom of the adsorber In any case, a ring-shaped bladder may be provided in the inlet end of the chamber to occupy void space in the inlet end. A similar open-cell material could be used in conjunction with the bladder to assist in providing uniform distribution of the fluid to the adsorbent bed. By including this system in the bottom head of the vessel, the void volume of the vessel is likewise reduced.

The cost of this simple system is relatively low and the installation procedures are relatively simple.

The invention is well suited for retrofit into existing axial bed apparatus. For example, an existing apparatus with a barrier in the form of a metal screen can be fitted with a barrier, a pile of balls, and a bladder in the outlet end. The bladder provides the uniform hold down force on the barrier. The bladder is affixed to the underside of the top end wall and inflated after the conventional loading of adsorbent is complete. Thus, no additional loading complications are encountered.

FIG. 4 shows one possible sliding seal 60 assembly which could be used along a peripheral edge of the barrier where it meets the peripheral wall of the chamber. The screen assembly is fixed to a rigid backing plate 62 of the sliding seal at the bed surface interface preventing leakage of adsorbent material at this intersection. A soft material or foam material is attached to the sliding seal plate which is in direct contact with the inside diameter of the vessel wall. This contact prevents blow-by at the junction of the seal assembly and the vessel wall. Typical design of the sliding seal assembly will contact the wall for a distance of 0.1–10 cm. Other variations of this seal may be employed within the concept of this invention. This region is a location where local fluidization is of major concern. Fluidization in this region results in blow-by of ads or bent into the top graded ball section of the vessel.

A further improvement, inherent in the above designs, is that the excessive void space at the top of the vessel above the adsorbent bed is substantially eliminated or minimized by the incorporation of the balls and the pneumatic bladder in the void space that would normally trap separated fluid product. Eliminating the excess void space above the bed forces more separated fluid product to flow out through the outlet port, thus raising the overall efficiency of the apparatus. It should be emphasized that the reduction in end space by use of the flexible bladder is well suited to retrofit as well as in new designs, and may be employed additionally for the reduction of end space at the bottom of the vessel as well.

The bladder and ball support must be provided to the apparatus such that uniform flow to and from the bed is maintained with a minimum pressure drop. Uniform flow distribution to and from the bed at minimum pressure drop is achieved through selection of the size and placement of the balls above the adsorbent; the location and design of the inlet baffle; and through the shape and size of the inflated bladder. In practice 100% of the volume above the barrier 30 is occupied by either the bladder 50 or the balls 36, thereby reducing void volume in this area to that of the void space contained between the packed balls. The bladder 50 preferably occupies 10–70% of the volume above the bed, i.e., "the top head". The graded balls preferably occupy the remaining volume within the top head. The ball sizes are selected to have diameters in the range of ⅛"–1 ½" at the surface of the adsorbent bed, and in the range of ½"–3" at the outlet port of the adsorber. A typical design pressure drop for this assembly is between 0.05 to 50% of the total bed pressure drop. The use of the bladder and ball assembly typically reduces the void space above the adsorbent by as much as 30–80%.

The secondary baffle 58 is designed to be loaded by the top bladder. This holds the baffle in place and also loads the balls under the baffle. The bottom of the secondary baffle can be covered with a dense mat to provide more uniform loading of the balls directly under the baffle.

Occlusion of end space volume can be accomplished in several ways.

(1) The flexible bladder described above can be inserted into the end space and then inflated to occlude volume in the end space. Additionally the bladder device can be cyclically inflated and deflated during the process to act as a pump forcing end space gas through the bed or out of the vessel.

(2) A rigid frame may be constructed inside the end space using tubular, wire or plastic members which can be covered with structural fabric or membrane (not shown) that is impervious to gas. The frame defines, and the fabric confines the volume to be occluded; flow distribution is maintained within the assembly in a manner similar to that described utilizing the balls and baffles. Additional structural rigidity and the elimination of gas from the occluded volume can be achieved by using a formed-in-place material.

(3) Smaller hollow structures can be substituted for the solid ceramic balls. The shells of the hollow shapes can be made from polymeric, metallic or fabric material. The major advantages of this method include: the ease of retrofit; allowance for the use of light weight flexible materials; ease of construction; potential to custom form complex geometry to control flow distribution; use in both the top and bottom end spaces.

The preferred orientation of this invention is in that of an axial flow adsorber as described in FIG. 1. The adsorbent restraint assembly of this invention can be employed in horizontal flow adsorber vessels. The adsorbent bed is now contained within a horizontally oriented cylindrical container closed at either end. The flow into and out of the adsorber vessel is through nozzles located on the top and bottom of this cylindrical container.

The preferred orientation of this invention is that of the vertical axis axial flow adsorber. The restraint as described by this invention would also allow for the vessel of FIG. 1 to be tipped on its side 90 degrees from the vertical.

Figure 7:
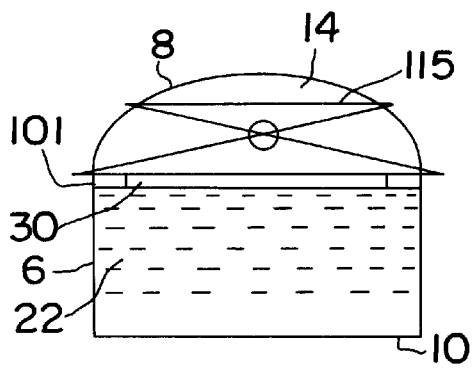
FIG. 7 is a side cross-sectional view of an adsorber apparatus showing a retainer ring biased by a representative spring means.
Figure 8:
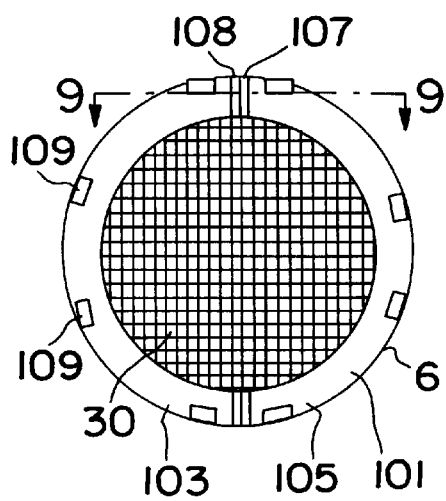
FIG. 8 is a top cross-sectional view of an adsorber apparatus with a retainer ring provided with attaching means in the form of retention feet and flanges; and, FIG. 9 is a side cross-sectional view taken along line 9—9 in FIG. 8.
Figure 9:
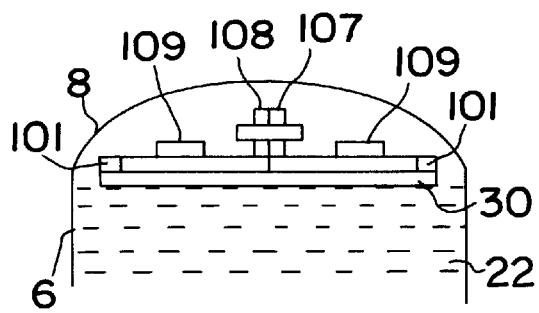

A rigid retention system consisting of a rigid split retention ring 101 (FIGS. 5–9) located around the periphery of the vessel and holding down a flexible open screen or perforated plate 30 may also be incorporated in the apparatus. Such a ring may be split into two or more sections 103, 105 (FIGS. 8–9) so that it can be inserted into the vessel after it has been loaded with adsorbent. The ring sections 103, 105 are joined at flanges 107, 108 and are secured at the periphery of the vessel by retention plates 109 attached permanently to the inside of vessel wall 6 or 8 and bearing directly against the ring surface, the ring assembly thus imparting rigidity to the flexible screen. Such rigid retention ring can also be designed as a distribution baffle. Optionally, a compressible member 115 (FIG. 7) may be inserted between the ring sections and the retention plates 109 to facilitate assembly and operation.

The openings in the screen or perforated plate are chosen carefully to retain the smallest particles while preventing plugging or significant reduction in open area—a condition which would lead to severe increases in pressure drop.

A rigid frame-like retainer assembly 150 (FIGS. 5–6) may be substituted for the bladder or may be provided in combination with the bladder to provide additional hold-down force for the retention assembly. Such a spider-like retainer 150 may be inserted and assembled inside the vessel after loading of the adsorbent. An active spring-loaded retainer 115 (FIG. 7) (e.g. leaf spring, or Belleville washers) may be similarly utilized. Alternatively, the biasing means may comprise a simple passive hold-down consisting of inert ceramic balls or similar material (FIG. 1). In this latter case, the upper end space voids are reduced as an added benefit to process performance. All of these additional restraints must be added subsequent to loading of the adsorbent since current loading methods require unobstructed space inside the top of the vessel.

The apparatus and method of the present invention can be used in a number of fluid separation applications. Since the foregoing and other changes may be made in the preferred embodiments of the invention described hereinabove, it should be understood that the foregoing disclosure is intended to cover changes and modifications which do not constitute departures from the spirit and scope of the invention, as set forth in the appended claims.

What is claimed is:

1. An adsorber apparatus comprising:

a chamber defined by a peripheral wall and feed and distal end walls, said peripheral wall defining a cross-section of said chamber, the chamber having an outlet end adjacent to one of said feed and distal end walls and having an inlet end adjacent the other of said feed and distal end walls, and an axis extending from the inlet end to the outlet end;

an inlet port in fluid communication with said inlet end for supplying a fluid mixture to said chamber and for removing a gas from said chamber;

an outlet port in fluid communication with said outlet end through which a separated fluid product flows out of the chamber;

a particulate bed substantially filling a portion of the chamber between said inlet end and said outlet end, a surface of said bed facing said outlet end and formed from a plurality of particles each having a minimum dimension, said surface corresponding dimensionally to said cross-section;

a porous barrier on said surface, said porous barrier adapted to restrain said particles having said minimum dimension from entering said outlet end and adapted to permit the separated fluid product to enter said outlet end, wherein at least one of said porous barrier and said bed is movable along said axis toward the other of said porous barrier and said bed, means for biasing one of said porous barrier and said bed toward the other of said porous barrier and said bed such that said bed is restrained from fluidization; and distribution means between said porous barrier and said outlet port adapted to permit the separated fluid to flow from the porous means to the outlet port; wherein said distribution means is a plurality of balls.

2. The adsorber apparatus of claim 1 wherein said porous barrier has a plurality of apertures each having a dimension smaller than said minimum dimension of said particles.

3. The adsorber apparatus of claim 2, wherein said porous barrier comprises a screen, a perforated sheet, a fibrous mat or an open-celled material.

4. The adsorber apparatus of claim 1 wherein said means for biasing is an inflatable bladder.

5. The adsorber apparatus of claim 1 wherein said means for biasing is a spring.

6. The adsorber apparatus of claim 1 wherein said distribution means is positioned between said means for biasing and said porous barrier.

7. The adsorber of claim 1 wherein said biasing means comprise a plurality of balls having sufficient weight to bias the porous barrier.

8. A bed restraint for an adsorber apparatus having a chamber defined by a peripheral wall and feed and distal end walls, the peripheral wall defining a cross-section of said chamber, the chamber having an inlet end adjacent one of said end walls and an outlet end adjacent the other of said end walls, an axis extending from the inlet end to the outlet end, an inlet port in fluid communication with said inlet end for supplying a fluid mixture to said chamber, an outlet port in fluid communication with said outlet end for evacuating a separated fluid out of said chamber, a particulate bed filling a substantial portion of the chamber between said inlet end and said outlet end, a surface of said adsorbent bed corresponding dimensionally to said cross-section and facing said outlet end, said surface formed of a plurality of individual particles each having a minimum dimension, the restraint comprising:

a porous barrier adapted to substantially cover said surface, said barrier movable with said surface along said axis, said barrier adapted to restrain said individual particles from entering said outlet end and adapted to permit the separated fluid product to enter said outlet end;

means for biasing said porous barrier toward said bed such that said particles are restrained from fluidization;

distribution means between said porous barrier and said outlet port adapted to permit the separated gas to flow from the porous barrier to the outlet port; wherein said distribution means is a plurality of balls.

9. The bed restraint of claims 8, wherein said porous barrier has a plurality of apertures each having a dimension smaller than said minimum dimension of said particles.

10. The bed restraint of claim 9, wherein said porous barrier comprises a screen, a perforated sheet, a fibrous mat or an open-celled material.

11. The bed restraint of claim 8, wherein said means for biasing is an inflatable bladder.

12. The bed restraint of claim 8, wherein said means for biasing is a spring.

13. The bed restraint of claim 8, wherein said distribution means is positioned between said means for biasing and said porous barrier.

14. The bed restraint of claim 8, wherein said biasing means comprise a plurality of balls having sufficient weight to bias the porous barrier.

15. A method for restraining a particulate bed of an adsorber apparatus having a chamber defined by a peripheral wall and feed and distal end walls, the peripheral wall defining a cross-section of said chamber, the chamber having an inlet end adjacent to said end walls and an outlet end adjacent to the other of said end walls, an axis extending from the inlet end to the outlet end, an inlet port in fluid communication with said inlet end for supplying a fluid mixture to said chamber, an outlet port in fluid communication with said outlet end for evacuating a separated fluid out of said chamber, a particulate bed filling a substantial portion of the chamber between said inlet end and said outlet end, a surface of said particulate bed corresponding dimensionally to said cross-section and facing said outlet end, said surface formed of a plurality of individual particles each having a minimum dimension, the method comprising:

covering said surface with a porous barrier, said barrier movable with said surface along said axis, said barrier adapted to restrain said individual particles from entering said outlet end and adapted to permit the separated fluid product to enter said outlet end;

biasing said porous barrier toward said particulate bed such that said particulate bed is restrained from fluidization;

positioning distribution means between said porous barrier and said outlet port, said distribution means adapted to permit the separated gas to flow from the porous means to the outlet port; wherein said distribution means being a plurality of balls.

16. The method of claim 15 further including:

positioning said plurality of balls between said porous barrier and said outlet end such that the separated gas can flow from the porous barrier to the outlet port through voids between the balls;

positioning a bladder between said outlet end and said plurality of balls; and inflating said bladder to bias said barrier toward said surface.

* * * * *